United States Patent [19]

Stevens et al.

[11] 4,080,161
[45] Mar. 21, 1978

[54] PERMANENT TOPICAL ANTISTATS

[75] Inventors: Violete L. Stevens; Arthur R. Sexton, both of Midland; James W. Lalk, Shepherd, all of Mich.; Ronald D. Deibel, Dalton, Ga.; Fred P. Corson, Sudbury, Mass.

[73] Assignee: The Dow Chemical Company, Midland, Mich.

[21] Appl. No.: 678,574

[22] Filed: Apr. 20, 1976

Related U.S. Application Data

[63] Continuation-in-part of Ser. No. 553,713, Feb. 27, 1975, abandoned.

[51] Int. Cl.$^2$ .................. C08G 23/22; D06Q 1/02
[52] U.S. Cl. .................... 8/115.6; 260/78.41; 260/410.6; 260/850; 427/385 B; 427/386; 427/390 A; 427/390 B; 560/246
[58] Field of Search .................. 8/115.6; 427/390 B, 427/390 A, 385 B, 386; 260/78.4 EP, 410.6, 488 J

[56] References Cited

U.S. PATENT DOCUMENTS

| | | | |
|---|---|---|---|
| B444,078 | 3/1976 | Stevens et al. | 260/47 EQ |
| 2,131,142 | 9/1938 | Orthner et al. | 260/482 |
| 3,100,157 | 8/1963 | Schroeder et al. | 106/287 |
| 3,211,561 | 10/1965 | Gearhart et al. | 106/180 |
| 3,446,756 | 5/1969 | Ramos | 260/2 |
| 3,509,074 | 4/1970 | Kamio et al. | 260/2 |
| 3,519,559 | 7/1970 | Quinlan | 210/54 |
| 3,551,152 | 12/1970 | Mackey et al. | 96/85 |
| 3,578,719 | 5/1971 | Kalopissis et al. | 260/611 |
| 3,595,924 | 7/1971 | Kalopissis et al. | 260/615 |
| 3,637,523 | 1/1972 | Harwood | 252/356 |
| 3,637,774 | 1/1972 | Babayan et al. | 260/410.6 |
| 3,666,671 | 5/1972 | Kalopissis | 252/173 |
| 3,720,695 | 3/1973 | Meisters | 260/404.8 |
| 3,936,422 | 2/1976 | Wirth et al. | 260/45.95 N |
| 4,014,854 | 3/1977 | Stevens et al. | 260/47 EQ |

FOREIGN PATENT DOCUMENTS

| | | |
|---|---|---|
| 1,438,201 | 5/1966 | France. |
| 1,267,259 | 3/1972 | United Kingdom. |
| 1,267,259 | 3/1972 | United Kingdom. |

OTHER PUBLICATIONS

Clark, American Dyestuff Reporter, 1967 (Feb. 27) pp. 37–43.

*Primary Examiner*—A. Lionel Clingman
*Attorney, Agent, or Firm*—David H. Fifield; C. E. Rehberg

[57] ABSTRACT

Antistatic compositions for topical application to substrates, which comprise (a) a polymer of less than about 20,000 molecular weight consisting essentially of, in polymerized form, about 10 to 99 mole % alkylene oxide, of 2 to 4 carbon atoms, about 1 to 90 mole % glycidol and about 0 to 15 mole % of the glycidyl ester of a fatty acid of about 2 to 20 carbon atoms and about 0 to 15 mole % of the glycidyl monoester of a polycarboxylic acid, (b) a curing agent capable of cross-linking the polymer by reaction with the primary hydroxyl groups of the glycidol units, such as melamine-formaldehyde condensates, dialdehydes, polycarboxylic acids and their anhydrides, epoxy resins (polyepoxides), polyisocyanates, and the like and (c) a catalyst for the curing reaction, such as zinc fluoroborate, a sulfonic acid, phosphoric acid, ammonium sulfate or the like.

13 Claims, No Drawings

PERMANENT TOPICAL ANTISTATS

This application is a continuation-in-part of Ser. No. 553,713 filed 2/27/75 now abandoned.

CROSS-REFERENCE TO RELATED APPLICATIONS

Copending applications Ser. No. 444,078 filed Feb. 20, 1974, now U.S. Pat. No. 4,014,854, and Ser. No. 633,539 filed Nov. 19, 1975, as a continuation-in-part of Ser. No. 466,099 filed May 2, 1974, and now abandoned, by three of us (Stevens, Sexton and Corson), disclose polymers suitable for use in the present invention and methods for making such polymers. For such disclosure, they are hereby incorporated herein by reference.

BACKGROUND OF THE INVENTION

Textiles containing acrylic, polyester or polyamide fibers and films of such thermoplastics are prone to develop objectionable static electric charges. An excellent general review of various antistatic compositions and processes for ameliorating the static problem is that of John E. Clark, Am. Dyestuff Reporter, Feb. 27, 1967, pp. 37–43.

Topical antistats, i.e., those designed for surface application to reduce static charge build-up, have been unsatisfactory for use on textiles because of defects such as lack of permanence, unpleasant hand (greasy feel, harshness, etc.), or undesirable appearance or odor, etc. Desirably, such antistats should be such that they can be applied from an aqueous medium and then rendered wash-resistant by a simple after-treatment. They should not impart odor, color, greasiness, unpleasant hand, dullness or other undesirable property to the substrate nor adversely affect its normal utility.

SUMMARY OF THE INVENTION

The antistatic composition of the invention comprises:
(a) a polymer of less than about 20,000 molecular weight consisting essentially of units of the formula

—CH$_2$CHRO— where in about 10 to 99%, preferably about 50 to 95%, of the units R is H, CH$_3$ or C$_2$H$_5$, in about 1 to 90% preferably about 5 to 50%, R is CH$_2$OH, and in about 0 to 15%, preferably about 1 to 5%, R is R'COOCH$_2$ wherein R'CO is the acyl group of a fatty acid of about 2 to 20, and preferably about 8 to 18, carbon atoms or of a polycarboxylic acid,
(b) a curing agent for said polymer that is capable of crosslinking the polymer; and
(c) a catalyst that catalyzes the reaction between the polymer and the curing agent.

As is apparent from the above formula, the preferred polymer is a copolymer of alkylene oxide, glycidol and a glycidyl ester of a fatty acid or polycarboxylic acid, though the glycidyl ester moieties are not essential. The preferred polymer is of about 500 to about 20,000 and most preferably about 3,000 to about 7,000 weight average molecular weight. Also preferred is a polymer wherein an average of about 1 to about 2 glycidyl ester moieties are present for about each 5000 unit of molecular weight. Above about 20,000 molecular weight, the polymers are extremely difficult to handle and dealkylate and become impractical for use herein.

The curing agent is preferably one that is capable of crosslinking the polymer by reaction with the hydroxyl groups of the glycidol units. Such agents are well known and include aldehydes, melamine-formaldehyde condensates, polycarboxylic acids and their anhydrides, polyisocyanates, polyepoxides, and the like.

The nature of the catalyst depends on the type of curing agent used. Thus, acidic materials, such as zinc fluoroborate, organosulfonic acids, phosphoric acid, ammonium sulfate or persulfate or the like are effective to catalyze the reaction of carboxylic acids or anhydrides, epoxides, aldehydes and melamine-formuladehyde condensates while tertiary amines and other bases are effective with isocyanates.

The above composition is conveniently applied to textile materials from an aqueous dispersion, the treated material is dried and the surface coating thus produced is then cured by a brief heat treatment. This fixes the composition on the fiber so that it is resistant to removal by normal wear, laundering, drycleaning, and the like.

A major advantage of the invention is that many of the polymers used in the composition are water-soluble or sufficiently surface-active to be self-emulsifying in water, thus eliminating need for a separate surfactant. A related advantage is that the composition in the form of an aqueous solution or emulsion can be applied to only one side of a textile product, such as cloth or carpet, and will penetrate through the textile, thus becoming effectively distributed to the opposite side and to the individual fibers or threads constituting the textile product.

The flexibility inherent in the invention by virtue of the wide variation in number and size of ester groups and in the frequency of crosslinks in the cured composition, as well as in the relative proportions of alkylene oxide and glycidol units in the polymer, permits wide variation and precise control of the effect of the antistatic treatment on the textile material.

DETAILED DESCRIPTION OF THE INVENTION

While it is possible to apply the antistatic composition of the invention to textile materials in the form of a solution or dispersion in an organic solvent, it is far more practical to avoid the use of such solvents and to use aqueous solutions or dispersions instead. The concentration can be varied widely, depending largely on the nature of the textile material to be treated and the weight pick-up desired on the textile material. In a preferred application, such as on carpet made of synthetic fibers, such solutions or dispersions may suitably contain about 5 to 50 wt. % of the antistatic composition (total solids basis). While in most instances, the polymer component is adequately water-soluble or self-dispersing, conventional dispersing and emulsifying agents may also be used if desired.

The curing agent should be one that is unreactive in the composition under normal conditions but becomes reactive when the treated textile material is dried and subjected to a curing treatment. Such treatment may consist of heating to an elevated temperature. The amount of curing agent used should be adjusted to produce the desired degree of crosslinkage. Too little produces an inadequately cured product which may be sensitive to water or drycleaning solvents while too much may cause a harsh "hand" or excessive stiffness or brittleness of the fiber itself or the coating thereon. For adequate insolubilization of the resin, there should be an average of at least about two, and preferably three or more, hydroxyl groups per molecule and enough curing The static build-up of the treated carpet and of a control sample of the same carpet treated the same way except that no antistatic composition was applied thereto was determined by AATCC Method 134-1969. The control sample developed a charge of 12,300 volts whereas the treated example developed only 6100 volts.

EXAMPLE 2

A copolymer of molecular weight 5000 was prepared as described above from a 75:25 molar ratio of ethylene oxide and tert.-butyl glycidyl ether. It was then dealkylated and partially esterified with 1.5 molar equivalents of stearic acid, thus producing a copolymer containing in each molecule an average of about 57 ethylene oxide units, 17.5 glycidol units and 1.5 glycidyl stearate units. A composition similar to that used in Example 1 was prepared as a 20% solids dispersion of the copolymer in water together with 5% of the Cymel curing agent and 4% of the zinc fluoroborate catalyst (both based on copolymer). This was applied to a polyester fabric in an amount to provide a 1% by weight pick-up. After being dried and cured in a 150° C. oven the surface resistivity (static-build-up tendency) was compared to that of a 80 × 80 cotton fabric, both fabrics having been conditioned at 24° C. and 20% relative humidity. The resistivity of the cotton was $8 \times 10^{11}$ ohms while that of the treated polyester was $3 \times 10^{10}$ ohms.

EXAMPLE 3

A copolymer of molecular weight 5000, initiated with water, was prepared as described above from a 90:10 molar ratio of ethylene oxide and tert.-butyl glycidyl ether. It was then dealkylated and partially esterified with 1 molar equivalent of stearic acid, thus producing a copolymer containing in each molecule an average of about 90 ethylene oxide units, 9 glycidol units and 1 glycidyl stearate unit. A composition similar to that used in Example 1 was prepared as a 20% solids dispersion of the copolymer in water together with about 10% of the Cymel curing agent and about 6.5% of the zinc fluoroborate catalyst (both based on copolymer weight). This was applied to a polyester fabric in an amount to provide about 1-2 weight % pick-up. After being dried and cured in a 115° C. oven, the surface resistivity was about $6 \times 10^9$ ohms. For the untreated fabric, the reading was off scale, i.e., greater than $10^{15}$ ohms.

EXAMPLE 4

A copolymer of molecular weight 3000, initiated with dodecyl alcohol, was prepared as described above from a 75:25 molar ratio of ethylene oxide and tert.-butyl glycidyl ether. After complete dealkylation, the dealkylated copolymer was used to prepare a 20% solid dispersion in water together with about 5% of the Cymel curing agent and about 5% zinc fluoroborate catalyst (both based on copolymer weight). After application to a polyester fabric, drying and curing in the manner of Example 3, the surface resistivity was about $1 \times 10^{11}$ ohms versus greater than $10^{15}$ ohms for the untreated fabric.

We claim:

1. A topical antistatic composition for use on a substrate to impart antistatic properties thereto, said composition comprising
    (a) a polymer of less than about 20,000 molecular weight consisting essentially of units of the formula

    —CH$_2$CHRO— where in about 10% to 99% of the units R is H, CH$_3$ or C$_2$H$_5$, in about 1% to 90% R is CH$_2$OH, and in about 0% to 15% R is R'COOCH$_2$, wherein R'CO is the acyl radical of a fatty acid of about 2 to 20 carbon atoms or a polycarboxylic acid,
    (b) a curing agent for said polymer having a plurality of groups reactive with primary hydroxyl groups, and
    (c) a catalyst that catalyzes the reaction between the polymer and the curing agent.

2. The composition of claim 1 wherein the curing agent is a melamine-formaldehyde condensate.

3. The composition of claim 1 wherein the catalyst is toluenesulfonic acid.

4. The composition of claim 1 where in at least one —CH$_2$CHRO— unit, R is R'COOCH$_2$.

5. A process for reducing the tendency of a substrate to accumulate an electric charge comprising
    (a) applying to the substrate a composition of claim 1 and
    (b) curing said composition on the substrate.

6. The process of claim 5 wherein the curing agent is a melamine-formaldehyde condensate.

7. The process of claim 6 wherein the catalyst is toluenesulfonic acid.

8. The process of claim 5 wherein the substrate is a textile material.

9. The process of claim 5 wherein the substrate is carpet.

10. An article that has been treated by the process of claim 5 wherein the substrate is a textile material.

11. The process of claim 10 wherein at least one —CH$_2$CHRO— unit, R is R'COOCH$_2$ and at least one R' is the C$_{17}$H$_{35}$ residue of stearic acid.

12. The composition of claim 4 wherein at least one R' is the C$_{17}$H$_{35}$ residue of stearic acid.

13. The composition of claim 1 wherein the polymer is essentially linear.

* * * * *

UNITED STATES PATENT AND TRADEMARK OFFICE
CERTIFICATE OF CORRECTION

PATENT NO. : 4,080,161
DATED : March 21, 1978
INVENTOR(S) : V. L. Stevens; A. R. Sexton; J. W. Lalk; R. D. Deibel; and F. P. Corson It is certified that error appears in the above-identified patent and that said Letters Patent are hereby corrected as shown below:

Title page, left column, at [63] delete the title "Related U.S. Application Data" and delete "Continuation-in-part of Ser. No. 553,713, Feb. 27, 1975, abandoned".

Title page, right column, delete "1,267,259 3/1972 United Kingdom" (second occurrence).

Column 1, lines 3-4 delete "This application is a continuation-in-part of Ser. No. 553,713 filed 2/27/75 now abandoned".

Column 2, line 10 delete "melamine-formuladehyde" and insert -- melamine-formaldehyde --.

Column 3, line 59 delete "esterfication" and insert -- esterification --.

Column 3, line 66 delete "the" and insert -- The --.

Signed and Sealed this

Twenty-second Day of August 1978

[SEAL]

Attest:

RUTH C. MASON
Attesting Officer

DONALD W. BANNER
Commissioner of Patents and Trademarks